United States Patent [19]
Kreft

[11] Patent Number: 6,002,981
[45] Date of Patent: Dec. 14, 1999

[54] CORRECTION METHOD AND INTELLIGENT VEHICLE GUIDANCE SYSTEM FOR A COMPOSITE-NAVIGATION OF A MOTOR VEHICLE

[75] Inventor: Peter Kreft, Hannover, Germany

[73] Assignee: Robert Bosch GmbH, Stuttgart, Germany

[21] Appl. No.: 08/737,214

[22] PCT Filed: Apr. 19, 1995

[86] PCT No.: PCT/DE95/00536

§ 371 Date: Nov. 5, 1996

§ 102(e) Date: Nov. 5, 1996

[87] PCT Pub. No.: WO95/30881

PCT Pub. Date: Nov. 16, 1995

[30] Foreign Application Priority Data

May 6, 1994 [DE] Germany .............................. 44 15 993

[51] Int. Cl.[6] .................................................. G06F 165/00
[52] U.S. Cl. ........................ 701/210; 701/200; 701/209; 340/990; 340/995
[58] Field of Search .................................. 701/200, 207, 701/208, 209, 210, 213, 217, 216; 73/178 R; 340/988, 990, 995, 991

[56] References Cited

U.S. PATENT DOCUMENTS

| | | | |
|---|---|---|---|
| 4,796,191 | 1/1989 | Honey et al. .......................... | 73/178 R |
| 4,807,127 | 2/1989 | Tenmoku et al. ...................... | 340/988 |
| 4,964,052 | 10/1990 | Ohe .......................................... | 340/995 |
| 4,999,783 | 3/1991 | Tenmoku et al. ...................... | 701/208 |
| 5,307,278 | 4/1994 | Hermans et al. ........................ | 340/991 |
| 5,359,529 | 10/1994 | Snider ...................................... | 340/990 |
| 5,374,933 | 12/1994 | Kao ........................................... | 701/213 |
| 5,523,765 | 6/1996 | Ichikawa .................................. | 701/213 |
| 5,583,775 | 12/1996 | Nobe et al. .............................. | 701/213 |

FOREIGN PATENT DOCUMENTS

| | | |
|---|---|---|
| 0166547 | 1/1986 | European Pat. Off. . |
| 0 314 806 | 5/1989 | European Pat. Off. . |
| 0471405 | 2/1992 | European Pat. Off. . |
| WO 93 23821 | 11/1993 | WIPO . |

OTHER PUBLICATIONS

Patent Abstracts of Japan, vol.13, No. 382, Aug. 24, 1989.

*Primary Examiner*—Gary Chin
*Attorney, Agent, or Firm*—Kenyon & Kenyon

[57] ABSTRACT

A correction method is provided for a map-supported navigation system or for a navigation system, in which the position of a motor vehicle found by means of composite navigation is checked and corrected. To correct the fed back position, a range of error is initially established, whose magnitude is determined by the tolerances of the vehicle sensors of the measuring errors of a navigation system. Within this range of error, all paved roads are taken into consideration as a possible vehicle position. A main route on which the vehicle is travelling is selected for the most probable position of the motor vehicle. The other positions continue to be used as parallel routes. If plausibility considerations reveal that a parallel route has a greater probability for the vehicle position than the present main route, then the parallel route is defined as the new main route. With the aid of a hysteresis, the current (actual) vehicle position is prevented from continually jumping back and forth among several streets.

28 Claims, 3 Drawing Sheets

CORRECTION METHOD AND INTELLIGENT VEHICLE GUIDANCE SYSTEM FOR A COMPOSITE-NAVIGATION OF A MOTOR VEHICLE

FIELD OF THE INVENTION

The present invention relates to a method for correcting composite-navigation and to a navigation system of a motor vehicle.

BACKGROUND INFORMATION

When working with a map-supported navigation system, conventional systems are used to determine position using a composite-navigation process in which the data supplied by the sensors of a motor vehicle are compared to those of a digital road map. The vehicle position determined by the composite-navigation process is corrected, the vehicle being placed on a street that runs nearby. However, if many streets run at a similar angle relative to the travel direction of the vehicle, it is possible that the vehicle may be positioned on the wrong street. As it continues its trip, the vehicle remains on this "incorrect street", since no other test is performed to check the accuracy of this positional correction.

European Patent Application No. 0 314 806 describes that a range of error is determined for the estimated vehicle position, whose magnitude is predetermined by the tolerances of the sensors for the length of travel and the driving direction. By means of a computer, those vehicle positions, which are transmitted for a given driving situation, are calculated for all streets within the range of error. By estimating the distances and other parameters, the vehicle position whose street characteristic curve comes the closest is determined to be the actual position. In this conventional method, the problem arises that when working with a narrow network of streets having several parallel routes situated closely together, the street can not always be found on which the vehicle is actually driving.

SUMMARY OF THE INVENTION

One of the advantages of the correction method and the navigation system according to the present invention is that several possible vehicle positions are calculated concurrently, all travel routes within a driving area being considered. Even when a main route is found for the most probable vehicle position, it is retained only until a parallel route reaches a greater level of probability for the vehicle position on the basis of plausibility considerations. This yields the advantage that the navigation vehicle guidance) becomes more reliable, and the vehicle is always localized on the street where it is actually located.

It is also advantageous to include the measuring tolerances of the sensors and/or of the navigation device, so that the range of error is always calculated (or estimated) to ensure that the vehicle is situated within the ranges of error. This ensures that the potential vehicle locations are determined for all streets in the driving area.

It is also beneficial to select a street as the main route whose direction substantially conforms with that of the composite navigation travel route and which is the closest to the route. If the main route is selected again when additional measurements are taken, for example, also in view of the life span of the route or its angle of inclination, then it is highly probable that it corresponds to the actual travel path of the vehicle.

To avoid vacillating back and forth to determine the most likely vehicle position (main route position), for example, when streets run in parallel and at a small distance from one another in sections, an evaluation (qualification) hysteresis is provided, so that the main route is not changed until several measurements have proven such a change to be plausible.

When the length of the travel path is measured, sensor-related errors occur, which can then be simply recognized when the vehicle travels out or turns off at an intersection. Since the position of the intersection is determined by its exact coordinates, a reference point is thus obtained between two measuring marks, which can be used to correct the length measurement.

Since the position of the vehicle can also be determined using navigation satellites, the simplest way to eliminate errors occurring transversely to the driving direction (route and direction) is to mathematically place the vehicle transversely to the driving direction on all roughly parallel running streets. These parallel routes are pursued further during continued travel and checked so that, after a plausibility check, the most probable parallel route is determined as the new main route.

In addition, it is advantageous that when the present invention is employed in a guidance system, the route is searched by using the main route as the starting point for a route calculation. Also, should there be ambiguity with respect to the route (two or more routes nearly equally plausible), the target (destination) route can become the criterion for deciding the main route selection, since the probability is great that the driver of the vehicle will follow the route recommended by the system. Using a parallel-route evaluator and comparator, the desired main route can be corrected at any time based on parallel-route calculations. If the navigation system has a display for a road map, then the current (actual) main route can be highlighted accordingly on a display.

DETAILED DESCRIPTION OF THE INVENTION

Figure 1:
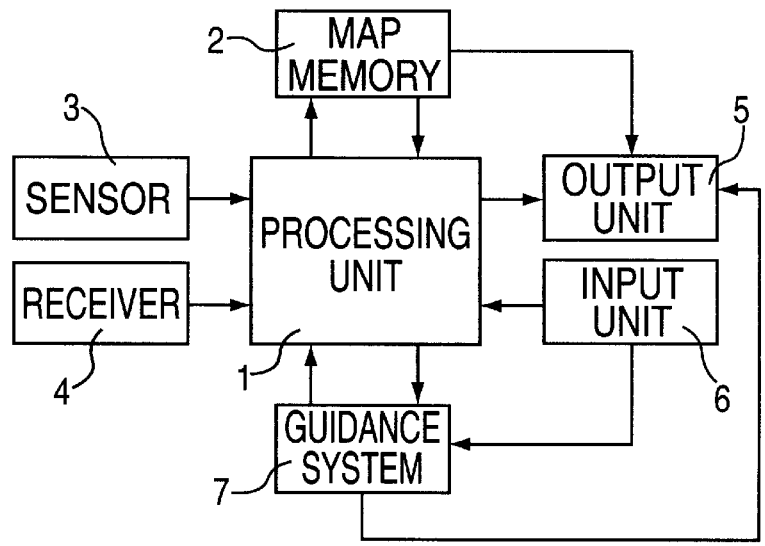
FIG. 1 shows a first block diagram according to the present invention.

FIG. 1 depicts a first block diagram of a map-supported navigation system, in which a processing unit 1 is connected on the incoming side to vehicle sensors 3 to record travel direction and trip distance. Also linked thereto is a satellite navigation receiver (e.g., GPS receiver) 4, likewise for determining vehicle position. Furthermore, processing unit 1 is linked to a readout unit 5, e.g., a display or an acoustical output. Furthermore, an input unit 6 and a guidance system 7 are linked to processing unit 1. Guidance system 7 or satellite receiver 4 are optionally provided.

Figure 4:
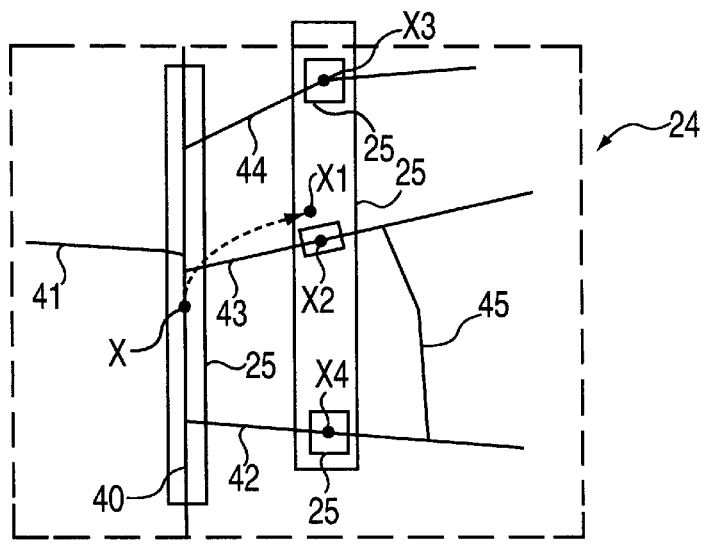
FIG. 4 shows a first section of a digital road map according to the present invention.
Figure 2:
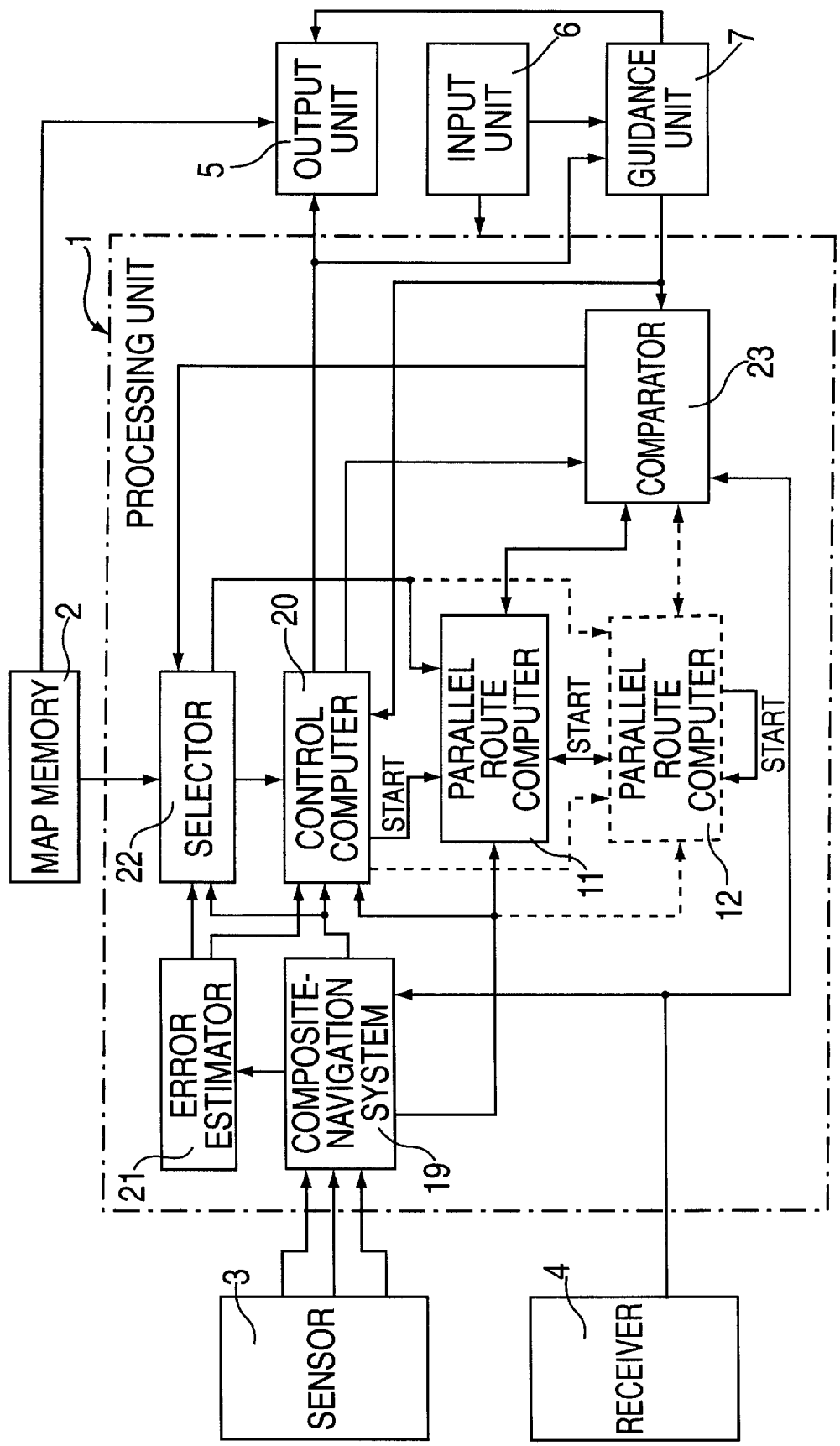
FIG. 2 shows a second block diagram according to the present invention.

FIG. 2 illustrates in detail a second block diagram of the navigation system, processing unit 1 being shown with a plurality of functional blocks. Processing unit 1 contains a composite-navigation dead-reckoning system 19, which receives the signals from sensors 3 and/or satellite receiver 4. From the sensor signals and the previous position, composite-navigation system 19 calculates a new position for the vehicle. The composite-navigation information and the sensor evaluation are transmitted to an error estimator 21, which establishes a range of error (error span) 25 based on known tolerance errors (FIG. 4). The range of error 25 is transmitted to a selector 22, which is linked, on the one hand, to map memory 2. Map memory 2 provides selector 22 with those streets which come under driving area 24. This driving area 24 corresponds then to the main route and to the parallel route area of the road map (FIG. 4).

Selector 22 is linked to a control computer 20 and relays the main route area and parallel route area to control computer 20. Furthermore, control computer 20 is connected to composite-navigation system 19 and receives from it the composite-navigation dead-reckoning data for the vehicle. The control computer initially determines the main route independently of the parallel routes. Other possible vehicle positions, besides the main route (parallel routes), are determined here and pursued further on parallel route computers 11, 12. Each parallel route computer, in turn, can recognize several plausible vehicle positions and then start other parallel routes on the parallel route computers. The parallel route computers are controlled via appropriate control lines START. Each parallel route computer is thereby supplied via selector 22 with the map detail of driving area 24.

Parallel-route computers 11, 12 are connected to a parallel-route evaluator and comparator 23. The parallel-route evaluator/comparator evaluates the parallel routes on the basis of their status information (e.g., conformity of travel direction and street direction). Those parallel routes whose plausibility no longer matches that of the parallel routes and the main route are deleted (canceled).

The information pertaining to the absolute vehicle position and the estimated scatter variation range of a satellite-navigation receiving and evaluation device 4 can also cause those parallel routes to be canceled, whose position is no longer situated within the scatter range of the satellite-navigation position.

Furthermore, the parallel-route comparator 23 is linked to the composite-navigation system 19, which it can supply with correction data for the vehicle position (route correction).

When a guidance unit 7 is used, it likewise transmits its data to the parallel-route comparator 23, so that in the event of route ambiguity, that route is selected as the main route, which includes one element of the route to the target point (destination).

The composite-navigation position can also be corrected directly by the satellite-receiving and evaluation device 4.

The control computer 20 is linked to an output unit 5, on which, e.g., given a graphic display, a street detail is shown including the main route and a highlighted vehicle. Also possible, however, are direction arrows and travel route and direction recommendations, or an acoustical output via guidance unit 7.

Input unit 6 is linked, on the one hand, to processing unit 1 and, on the other hand, to guidance unit 7, so that, among other things, the destination entry can be input.

The method according to the present invention is illustrated in FIGS. 3 through 6.

Figure 3:
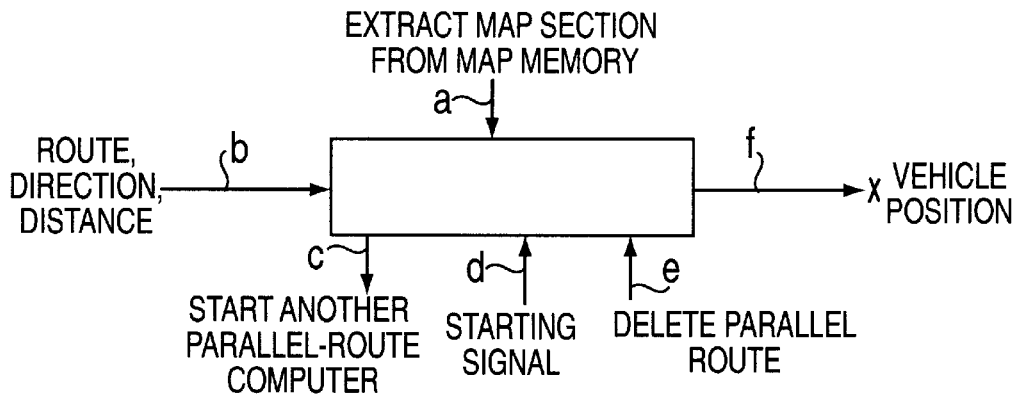
FIG. 3 shows a function diagram according to the present invention.

FIG. 3 illustrates, e.g., a function diagram for calculating position and determining the status of a parallel route using parallel-route computer 11, 12. It can be assumed, for example, that vehicle position X is to be calculated on a parallel route 31, which lies within driving area 24. In response to starting signal d, parallel-route computer 11, 12 extracts from map memory 2 that map section which corresponds to driving area 24 (position a). The route and direction and the driving distance of the motor vehicle, which had been determined by composite-navigation system 19, are entered at position b. Should ambiguities with respect to route arise again when this positional determination is made, then another parallel-route computer 11, 12 can be started at output c. Also determined in addition to position, for example, is a current status of the conformity between travel direction and street angle. Furthermore, a probability factor for the vehicle position can be defined in the status information. Also, the status information includes details of the life span of the parallel route. Both the positional determination as well as the status determination are routed via an output 11 to the parallel-route comparator 23, which, from all existing information and on the basis of plausibility checks, outputs a main route and current (actual) parallel routes. For example, the angle of inclination of a paved road can also be compared with that of the vehicle, and the main route determined therefrom. If a parallel route no longer falls under the driving area or no longer conforms with the compound course, then it can be deleted via an input e. The function diagram can be developed as a program for computer 1.

FIG. 4 illustrates a driving area 24, in which passable roads 40 through 45 are shown. The assumption is made here that the vehicle is initially located in position X on street 40, which is established momentarily as the main route. If the vehicle now turns off to the right, then an estimated position X1 results on the basis of the direct feedback and necessitated by angular and linear errors of the vehicle sensors. Because of the errors, a range of errors 25 is formed around position X1, as was already formed around position X. The range of errors 25 can vary in magnitude for each calculated position X . . . X4. The magnitude of the range of errors is determined by the specified tolerances. Therefore, FIG. 4 shows various ranges of errors 25 for the individual positions X . . . X4. The large, rectangular error field 25 of position X shifts, for example, along with the new vehicle position X1 and thereby varies its width. This reveals that the actual vehicle position lies within this field. It is, therefore, assumed that a new position (designated position) X2 is on street 43, which is the next one to follow the calculated position X1.

Now, on the basis of the turn-off angle of the vehicle in comparison to all roads which have formed a similar angle with the main route 40 existing until now, the control computer 20 determines the possible positions X2, X3 and X4 on parallel routes 42, 43 and 44, along with the corresponding new ranges of error 25. Roads 42, 43, 44 are situated within the range of errors of route position X1. Road 41 forms a turn-off angle in the opposite direction and, therefore, is no longer a factor in determining position. The described method, in which parallel-route positions (here X2, X3 and X4 and roads 44, 43 and 42) proceed from the range of errors 25 of the main route, can equally be applied by producing parallel routes from the range of errors 25 of a parallel route. The range of error 25 includes the travel-direction measuring error and a one-dimensional temporary stop area (possible linear error) or a two-dimensional temporary stop area (transverse and longitudinal error of the assumed position). Based on plausibility considerations, from positions X1 through X4, position X2 with the new error field 25 is selected as the new designated position on the newly selected main route (designated road) for which the vehicle position is most probable. Positions X3, X4 on parallel routes 42, 44 are calculated further and considered again when the next selection is made. Should one of the parallel routes 42 or 44 be possible as the main route when one of the next positional determinations is made, then one of the two parallel routes would be defined as a new main route. In borderline cases, to prevent a vehicle position X2 from jumping back and forth frequently, a hysteresis is provided as a function of time or distance for assessment purposes, so that a determination of a parallel route as a new main route is not changed until on the basis of a few measuring cycles or of a specific total trip distance.

It can also be inferred from FIG. 4 that when there is a turn off into the new main route 43, the turn-off point at crossing 43, 40 can be used as the defined correlation point for the length measurement. Alternatively, the difference X1–X2 can be used for the linear correction. The method for determining parallel-route positions X3 and X4 is to be carried out accordingly.

Figure 5:
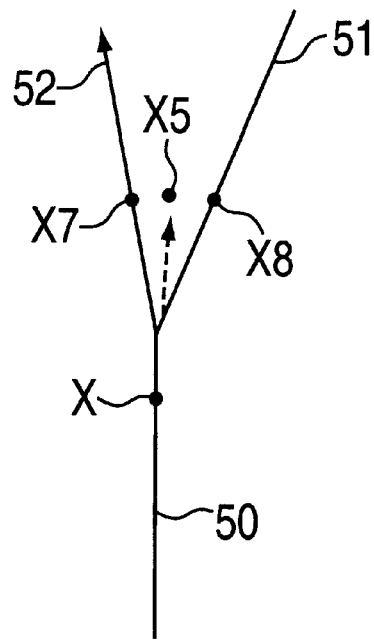
FIG. 5 shows a second section of the digital road map.

Similarly to the linear correction shown in FIG. 4, a positional correction can be performed as shown in FIG. 5. As an example, the vehicle is situated on the main route 50 in position X. The assumption is now made that the main route 50 divides at a fork into two parallel routes 51, 52. Because of the composite-navigation process, the vehicle would be situated at a certain instant in estimated position X5. Since position X5 is not a location on a street, possible positions X8 on parallel route 51 or X7 on parallel route 52 are acceptable. Given a repeated positional determination, also on the basis of the recommended route for the destination, a probability results for position X7 as the designated position on parallel route 52, which is now pursued further as the main route. Parallel route 51 continues to be relevant and continues to be calculated using the parallel-route computer 11, 12. On the basis of the change of angle from position X5 to X7, a correction value results for the determination of direction, which the continued composite-navigation process can be based on.

Figure 6:
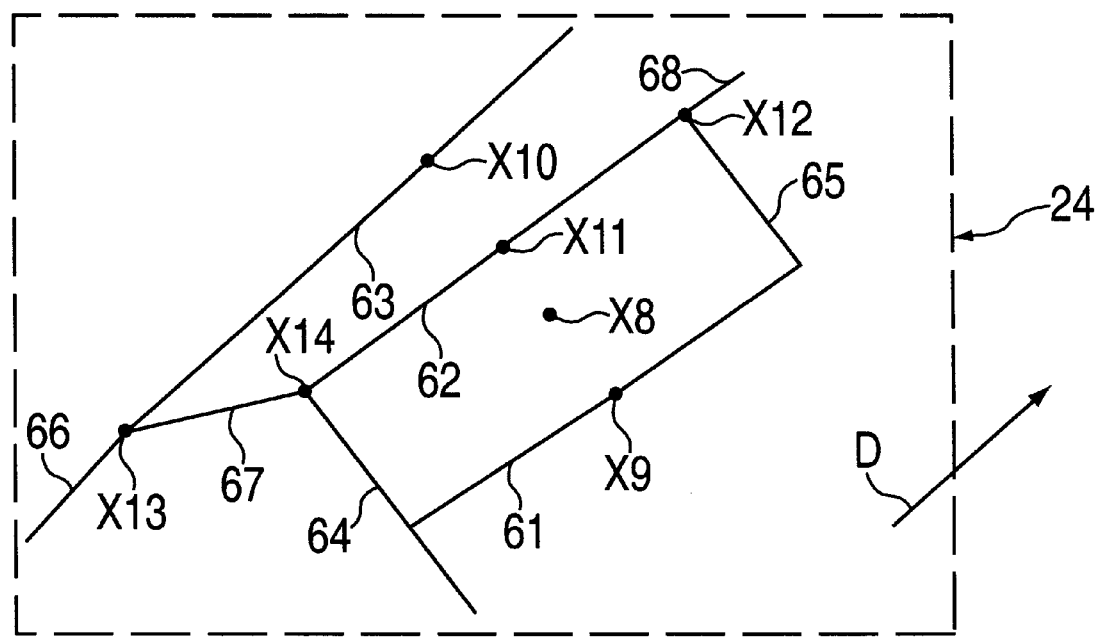
FIG. 6 shows a third section of the digital road map.

FIG. 6 shows a third section of a road map of a navigation system, in which case a satellite-navigation receiver 4 (e.g., GPS) is used for correcting composite-navigation. The satellite-navigation receiver determines its position from the location of several navigation satellites. This positional determination is likewise afflicted with a certain error. This error is compensated similarly to the examples of FIG. 4 or 5. Road sections/parallel routes 61 through 68 are shown in error field 24 of FIG. 6. For example, if as a possible location for the vehicle, GPS receiver 4 determines estimated position X8, then viewed in the travel direction D, possible position X9 is additionally calculated on parallel route 61 and possible position X10 on parallel route 63. However, possible positions X13 on 66, X14 on 67, and X12 on 68 can also be calculated. A position of the motor vehicle on parallel routes 64 or 65 is unlikely for plausibility reasons and is, therefore, eliminated. A recalculation is then performed to attain the greatest probability, for example, for a position X11 on parallel route 62, which now become the designated position and the main route (designated road), respectively. It is now assumed that the motor vehicle is at position X11, and this position is output, for example, on a display 5. Positions X9, X10, X12, X13, X14 on original streets 61, 63, 68, 66, 67 are pursued further for controlling the main route 62. However, they are not shown on display 5.

If the navigational system is coupled, for example, to a guidance device 7, then, after entering a target destination via input 6 of processing unit 1, a specific target route is selected. The target route is now so placed that it is calculated with the new main route 62 as the starting position.

The individual subassemblies of the navigation system or of the processing unit 1, such as the composite-navigation system 19, error estimator 21, selector 22, parallel-route computer 11, 12, or parallel-route comparator 23 are built using conventional modules, such as amplifiers, comparators, or logic modules. These are known to one skilled in the art from conventional navigational systems and, therefore, do not need to be elucidated further. In place of individual modules, it is also possible to provide one or more microcomputers, which are controlled by a corresponding control program.

What is claimed is:

1. A method for correcting a map-supported navigation system, comprising the steps of:

determining on a map stored in a map memory an estimated position of a vehicle using a composite navigation arrangement;

determining a first error range for the estimated position;

determining roads on the map that are substantially parallel to a vehicle direction;

determining a possible position of the vehicle on each road of the roads, each possible position being within the first error range;

determining concurrently a second error range for each possible position, the second error range being variable;

selecting a designated road from a set including the roads, the designated road being selected by determining a likelihood that the designated road represents an actual road on which the vehicle is traveling; and selecting the possible position on the selected road as a designated position.

2. The method according to claim 1, further comprising the step of:

receiving a navigation signal from at least one of a vehicle sensor and a navigation device.

3. The method according to claim 2, further comprising the step of:

forming a driving area as a function of the navigation signal.

4. The method according to claim 1, wherein the first error range and the second error range include at least one of a one-dimensional area and a two-dimensional area for at least one of a linear error range, a transverse error range and a directional error range.

5. The method according to claim 4, further comprising the step of:

correcting the linear error range of the composite navigation arrangement as a function of a difference between the estimated position and the designated position.

6. The method according to claim 1, further comprising the step of:

extracting the map from the map memory.

7. The method according to claim 1, further comprising the step of:

after selecting the designated position, evaluating each possible position, while plausible, as a potential subsequently designated position.

8. The method according to claim 1, further comprising the step of:

after selecting the designated road, evaluating each road, while plausible, of the roads as a potential subsequently designated road.

9. The method according to claim 8, further comprising the step of:

determining substantially parallel roads, where present, for each one of tho potential subsequently designated roads.

10. The method according to claim 1, wherein the designated position is output on a road map display.

11. The method according to claim 1, further comprising the step of:
   extending along one of the roads, the extended road maintaining initially information about the roads.

12. The method according to claim 1, wherein the step of selecting the designated road includes the step of comparing a first set of parameters of each of the roads with a second set of parameters including parameters ascertained from a navigational signal from at least one of a vehicle sensor and a navigation device.

13. The method according to claim 1, wherein the step of selecting the designated road includes the step of comparing a first set of parameters of each of the roads with a second set of parameters including at least one of an angle of inclination of the vehicle, actual slope of a road on which the vehicle travels and a length of time interval in which one of the roads has been plausible.

14. The method according to claim 1, wherein the step of selecting the designated road includes the step of using a hysteresis characteristic through which a change in a status of a previous designated road is delayed.

15. The method according to claim 1, further comprising the step of:
   calculating a difference between the estimated position and the designated position subsequent to the vehicle rounding a curve of the designated road.

16. The method according to claim 1, further comprising the step of:
   repositioning the estimated position of the vehicle using the data from a navigation-satellite receiver.

17. The method according to claim 16, wherein a particular road of the roads is not plausible if the particular road is entirely outside an error range of the navigation-satellite receiver.

18. The method according to claim 1, further comprising the step of:
   using a guidance system, wherein, when an ambiguity occurs in selecting the designated road, conformity with a target route as determined by the guidance system is considered.

19. A method for correcting a map-supported navigation system, comprising the steps of:
   determining on a map stored in a map memory an estimated position of a vehicle using a composite navigation arrangement;
   determining a first error range for the estimated position;
   determining roads on the map that are substantially parallel to a vehicle direction;
   determining a possible position of the vehicle on each road of the roads, each possible position being within the first error range;
   determining concurrently a second error range for each possible position, the second error range being variable;
   selecting a designated road from a set including the roads, the designated road being selected by determining a likelihood that the designated road represents an actual road on which the vehicle is traveling; and
   selecting the possible position on the selected road as a designated position,
   wherein the second error range is predetermined for each possible position, the second error range having a magnitude determined by at least one of a measuring tolerance of a vehicle sensor and a measuring tolerance of a navigation device, the second error range including one of a one-dimensional area and a two dimensional area, at least one of the one-dimensional area and the two-dimensional area being provided for at least one of a linear error, a transverse error and a directional error.

20. The method according to claim 19, wherein the second error range is a same size for all of the roads, the second error range being prescribed by tolerances of the sensor and tolerances of the navigation device.

21. The method according to claim 19, wherein the second error range is calculated for each of the roads.

22. The method according to claim 19, wherein each of the roads is associated with a respective error range, a size of the respective error range being determined by respective prescribed tolerances of the sensor.

23. A map-supported navigation system, comprising:
   a processing unit including a selector device and at least one computer for calculating parameters for roads that are substantially parallel to a vehicle direction;
   sensors coupled to the processing unit and providing navigational signals, the sensors ascertaining at least one of a vehicle direction and a distance traveled by the vehicle;
   a map memory coupled to the processing unit, the map memory providing data with respect to the roads;
   an input unit coupled to the processing unit; and
   an output unit coupled between the processing unit and the map memory, the output unit outputting a designated position of the vehicle,
   wherein the selector device accesses data with respect to the roads including data concerning an error range associated with each possible position on each of the roads, the selector device selecting a designated road by determining a likelihood that the designated road represents a road on which the vehicle is actually traveling, the error range including at least one of a one-dimensional area and a two-dimensional area for at least one of a linear error range, a transverse error range and a directional error range, the error range being determined concurrently for each possible position and being variable, and
   wherein the processing unit corrects the linear error range of a composite navigation arrangement as a function of a difference between an estimated position and the designated position, the estimated position determined using the composite navigation arrangement.

24. The map-supported navigation system according to claim 23, further comprising:
   a guidance unit coupled to the processing unit, to the output unit end to the input unit, the guidance unit assisting in selecting the designated road.

25. The map-supported navigation system according to claim 23, wherein the designated position is visually displayed on the output unit.

26. The map-supported navigation system according to claim 23, wherein the output unit displays the designated position on the designated road.

27. The map-supported navigation system according to claim 23, further comprising:
   a guidance unit coupled to the processing unit and to the input unit, the guidance unit generating a guidance starting position after entering a target destination via an input unit.

28. The map-supported navigation system according to claim 23, further comprising:
   a navigation-satellite receiver coupled to the processing unit, the navigation-satellite receiver using the received data to reposition the estimated position of the vehicle.

* * * * *